United States Patent Office 3,520,889
Patented July 21, 1970

3,520,889
SULFONAMIDE AZIRIDINYL COMPOUNDS
Giuliana C. Tesoro, Dobbs Ferry, N.Y., assignor to J. P. Stevens & Co., Inc., New York, N.Y., a corporation of Delaware
No Drawing. Filed June 1, 1965, Ser. No. 460,480
Int. Cl. C07d 51/72
U.S. Cl. 260—268                                      3 Claims

ABSTRACT OF THE DISCLOSURE

Sulfonamide compounds containing one or more aziridinyl groups of the formula:

I
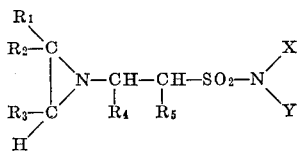

wherein the R substituents may be hydrogen or lower alkyl and X and Y are hydrogen, organic groups, or taken together form a heterocyclic ring. Such compounds can be prepared by the reaction of a suitable alkylene imine with an unsaturated sulfonamide in the presence of a solvent and at moderate temperatures. The sulfonamide compounds can be used for treating textile materials, as curing agents and for the preparation of polymers.

---

The present invention relates to novel sulfonamide compounds containing one or more aziridinyl groups and to methods for producing such sulfonamide compounds.

The sulfonamide compounds containing one or more aziridinyl groups of the present invention may be represented by the generic structural formula:

I
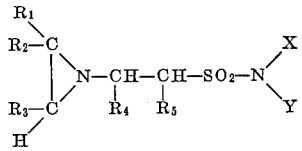

in which:
$R_1$, $R_2$, $R_3$, $R_4$ and $R_5$ are each selected from the group consisting of hydrogen and alkyl containing from 1 to 4 carbon atoms; i.e. lower alkyl, X and Y are each selected from the group consisting of hydrogen and organic groups, and X and Y taken together can form a heterocyclic ring of which the sulfonamide nitrogen is also a part, said ring having no more than 7 annular members.

Accordingly, it is an object of the present invention to provide novel sulfonamide aziridinyl compounds.

It is a further object of the present invention to provide polyfunctional compounds containing a plurality of aziridinyl sulfonyl groups.

It is a further object of the present invention to provide a novel group of sulfonamide aziridinyl compounds having valuable properties and making them suitable for a variety of purposes.

It is a further object of the present invention to provide a method for the preparation of novel aziridinyl sulfonamide compounds.

Included among the compounds represented by Formula I are compounds of the general formula:

II
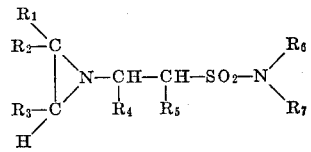

wherein:
$R_1$, $R_2$, $R_3$, $R_3$ and $R_5$ have the meaning previously given above, and
$R_6$ and $R_7$ are each selected from the group consisting of hydrogen and alkyl, alkenyl, hydroxy substituted alkyl, substituted and unsubstituted monovalent mononuclear aromatic and alkyl aromatic groups.

Representative groups included in the above from which $R_5$ and $R_7$ may be selected are alkyl from 1 to 8 carbon atoms, alkenyl from 2 to 3 carbon atoms, monohydroxy substituted alkyl from 1 to 6 carbon atoms, phenyl, halogen substituted phenyl, methyl substituted phenyl and the like.

Specific examples of compounds represented by the general Formula II are listed below:

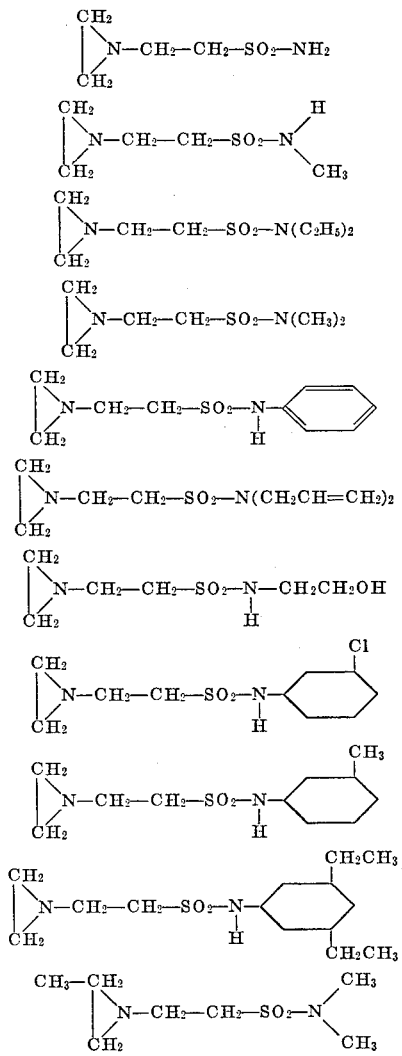

Included among the sulfonamide aziridinyl groups represented by the generic Formula I are the polyfunctional aziridinyl sulfonamide compounds represented by the formula:

II.
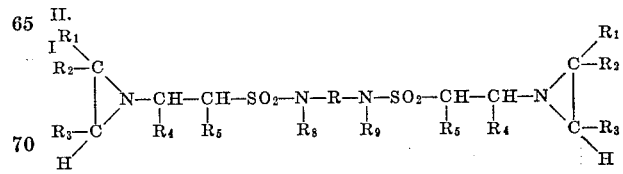

wherein: $R_1$, $R_2$, $R_3$, $R_4$ and $R_5$ have the meaning previously given above and $R_3$ and $R_9$ have the same meaning as $R_1$. It is to be understood that $R_1$, $R_2$, $R_3$, $R_4$ and $R_5$ can be the same or different.

R represents a divalent organic group selected from the group consisting of hydrocarbon and polyalkylene oxide groups such as alkylene from 1 to 20 carbon atoms and polyoxyalkylene groups such as

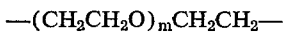

wherein $m$ is from 1 to 50.

Specific examples of these compounds include:

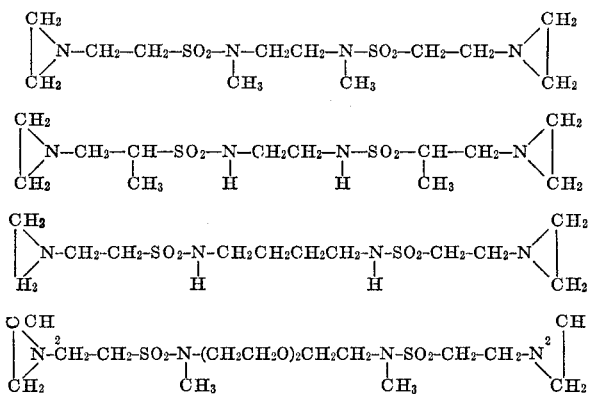

Further included under the general Formula I are compounds represented by the structure:

IV.
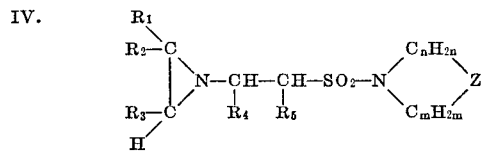

wherein $R_1$, $R_2$, $R_3$, $R_4$ and $R_5$ have the meaning given above,

Z is selected from the group consisting of

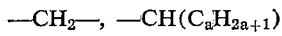

oxygen and sulfur, wherein $a$ has a value of 1 to 20, $m$ and $n$ have a value of from 1 to 4 and their sum is equal to at least 3, the range 3 to 5 being preferred.

Representative compounds coming within the scope of the formula above follow below:

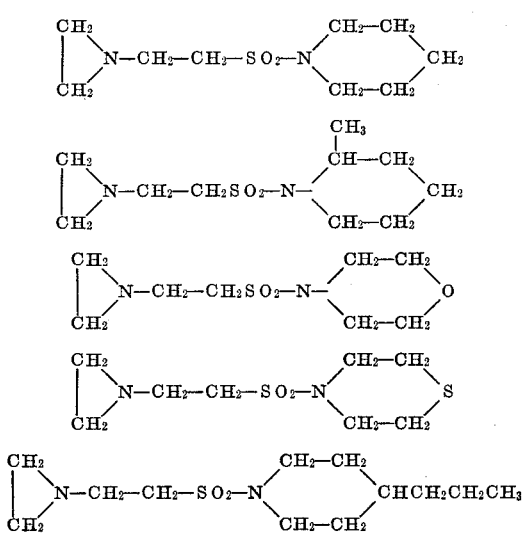

Additional compounds coming within the scope of the present invention are represented by the general formula:

V.
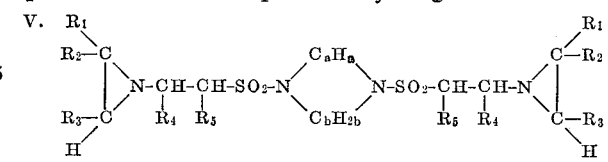

wherein $R_1$, $R_2$, $R_3$, $R_4$ and $R_5$ have the meaning previously given above;

wherein $a$ and $b$ are integers with a value of from 1 to 4 and the sum of $a$ and $b$ is at least 3, the range 3 to 5 being preferred. Sulfonyl-substituted piperazine compounds of Formula V can also be represented by the formula:

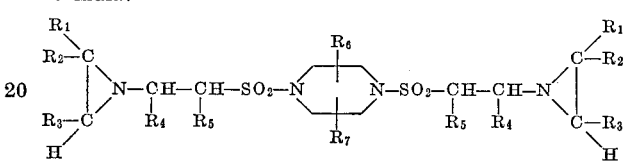

wherein $R_6$ and $R_7$ are hydrogen or a methyl group and all other substituents have the meaning previously given.

Specific examples of compounds encompassed by the above are listed below:

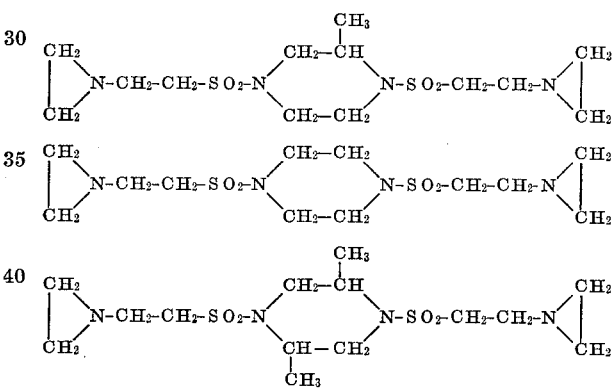

Further compounds that are included within the scope of the general Formula I are represented by the formula:

VI
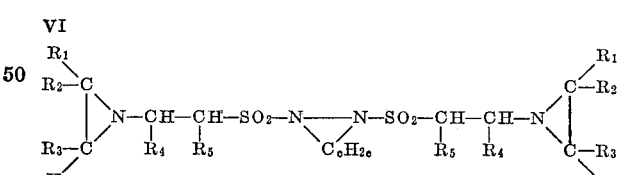

wherein $R_1$, $R_2$, $R_3$, $R_4$ and $R_5$ have the same meaning as previously given above, and $c$ is an integer with a value of 1 to 5.

Specific examples of compounds falling within the scope of the above formula are listed below:

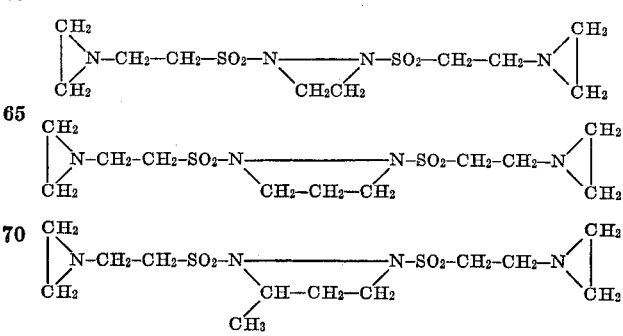

Additional compounds coming within the scope of the present invention and encompassed by the general Formula I containing three aziridinyl sulfonamide groups are represented by the structure:

VII

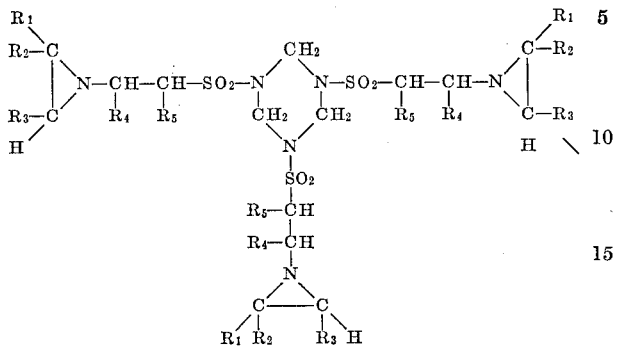

wherein $R_1$, $R_2$, $R_3$, $R_4$ and $R_5$ have the same meaning previously given above. A specific compound coming within the above formula is shown below:

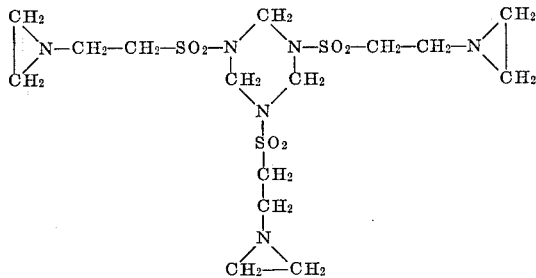

The novel aziridinyl sulfonamide compounds of the above type may be prepared by several methods. Generally, the most suitable method for the preparation of the compounds of the present invention is by reacting a suitable alkylene imine with appropriate unsaturated sulfonamides. The general equation for preparation of compounds in the present invention is shown below:

(1)

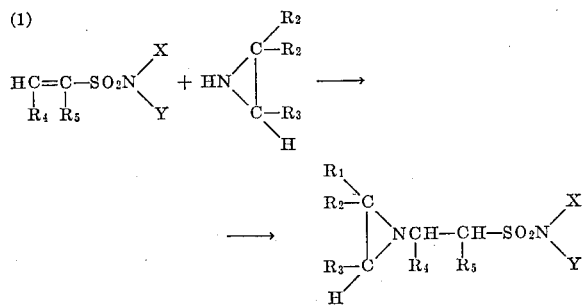

Reaction conditions for the preparation and isolation of the above sulfonamide compounds are selected based largely on considerations of the type of product that is desired as well as taking into account the structure of the starting materials. Preferably the reaction is carried out in the presence of an inert diluent and at moderate temperatures.

At least stoichiometric quantities of the alkylene imine are used. It has been found that an excess of the alkylene imine starting material is desirable in order to obtain a satisfactory yield. Typical reaction conditions are illustrated in the examples which follow hereinbelow which, however, do not constitute a limitation of the invention.

Of particular interest and significance is the preparation of the diallyl aziridinyl sulfonamides which are included among the compounds of the Formula II. The reaction is carried out at moderate temperature to obtain aziridinyl sulfonamides having unsaturated terminal groups which are then available for further reaction.

Various alkylene imines are suitable for the preparation of the compounds and have the general structural formula:

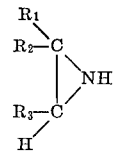

wherein $R_1$, $R_2$ and $R_3$ have the meaning previously given above. Mixtures of various alkylene imines may be used for purposes of the present invention.

Representative unsaturated sulfonamide compounds suitable as starting materials include:
Vinyl sulfonamide
N-methyl vinyl sulfonamide
N,N-dimethyl vinyl sulfonamide
N,N-diallyl vinyl sulfonamide
1,2-bis(N-methyl vinyl sulfonamidoethoxy) ethane
N,N'-bis(vinyl sulfonamido)-2-methyl piperazine
Bis vinyl sulfonamide of 2,5-dimethyl piperazine
N-phenyl vinyl sulfonamide The following examples are for the purposes of illustrating the novel sulfonamide compounds and methods of preparing same. As such, the examples are not to be considered as limiting the present invention but merely illustrative thereof.

EXAMPLE I

To a stirred solution of 4.3 parts by weight of ethylenimine in 17.5 parts of benzene, pre-cooled to 4° C., were added 12.28 parts of vinyl sulfonamide at such a rate as to maintain a temperature of 4–10° C. After the addition was completed, the mixture was allowed to warm spontaneously to 45° C., forming a solid mass. Crystallization of the solid from chloroform gave 2-(1 aziridinyl) ethane sulfonamide, I, M.P. 120° in the form of thick white needles. The product contains 27.85% aziridine, 19.08% nitrogen and 22.03% sulfur. The theoretical values for I are 28% aziridine, 18.66% nitrogen and 21.33% sulfur.

EXAMPLE II 12.1 parts by weight of N-methyl vinyl sulfonamide were added to a stirred solution of 8.6 parts of ethylenimine in 22 parts by weight of benzene with cooling at such rate as to maintain a temperature of 8–10° C. After the mixture had warmed to room temperature, the product was stripped of excess ethylenimine at room temperature and 0.1 mm. pressure to give N-methyl-2-(1-aziridinyl) ethane sulfonamide, II, which contained 21.6% aziridine, indicating a purity of 84.5%.

EXAMPLE III

To 8.6 parts by weight of ethylenimine were added 27 parts of N,N-dimethyl vinyl sulfonamide at 25–34° C. The mixture was stirred till the heat of reaction subsided, at which time the product was distilled at 0.5 mm. pressure. The fraction boiling at 110–112° C. had a refractive index at 23° of 1.4780 and contained 23.8% aziridine, 16.34% nitrogen and 17.3% sulfur, corresponding to N,N-dimethyl-2 (1-aziridinyl) ethane sulfonamide, III, for which the theoretical values are: 24.15% aziridine, 15.74% nitrogen and 17.9% sulfur.

EXAMPLE IV

N,N-diallyl vinyl sulfonamide, B.P. 83–87° (0.2 mm.), $nD^{23}$ 1.4841 (19.2 parts by weight) was added to 4.3 parts by weight of ethylenimine at 23–43° C. and the reaction mixture was allowed to cool to room temperature. The product was distilled at 118–122° (0.7 mm.), and had a refractive index of 1.4906 at 24° C. It contained 17.4% aziridine, 12.69% nitrogen and 13.36% sulfur, corresponding to N,N - diallyl-2 - (1-aziridinyl) ethane sulfonamide, IV for which the calculated values are: 18.25% aziridine, 12.16% nitrogen and 13.9% sulfur.

EXAMPLE V

The bis-2-aziridinyl ethane sulfonamide of 1,2-bis(N-methylamino ethoxy) ethane, V, was prepared by adding 38.7 parts by weight of 1,2-bis (N-methyl vinyl sulfonamidoethoxy) ethane to 12.9 parts of stirred ethylenimine at 21–29° with cooling. The mixture was stirred at room temperature until no more heat was evolved, then stripped at 25° C., and 0.1 mm. pressure. The resulting product contained 15.4% aziridine, corresponding to a purity of 81%.

EXAMPLE VI

A solution of 3 parts by weight of N,N'-bis (vinyl sulfonamido)-2-methyl piperazine in 22 parts of benzene was added at 19–26° to 2.76 parts of ethylenimine and the mixture was stirred at room temperature for one hour. The product was stripped of solvent and excess ethylenimine at room temperature and 0.1 mm. pressure leaving a semi-solid which was extracted with 20 parts by weight of benzene. Evaporation of the benzene left a tacky solid which contained 22% aziridine which corresponds to a purity of 93% a bis[2-(aziridinyl) ethane sulfonamido]-2-methyl piperazine, VI.

EXAMPLE VII

The bis vinyl sulfonamide of 2,5-dimethyl piperazine (10 parts by weight in 30 parts of benzene) was added at 26–36° with cooling to 6.08 parts of ethylenimine with stirring. The gel which formed after the addition was complete was dispersed by adding additional benzene and the suspension was stirred at room temperature for 3 hours. The product, bis (2-aziridinylethane sulfonamido)-2,5-dimethyl piperazine, VII, was obtained as a white solid by filtration and recrystallization from benzene, and melted at 134–138° C. It contained 21.8% aziridine, 15.3% nitrogen and 16.34% sulfur. The theoretical values for VII are: 22.2% aziridine, 14.71% nitrogen and 16.85% sulfur.

EXAMPLE VIII

A solution of 2 parts by weight of N-phenyl vinyl sulfonamide in 17.5 parts by weight of benzene was added with cooling to a stirred solution of 0.95 parts by weight of ethylimine in 17.5 parts of benzene at 24–28° C. The cooling bath was removed after the addition was complete and the mixture warmed spontaneously to 34° C. Stirring was continued until room temperature was attained, after which the product was stripped at room temperature and 0.1 mm. pressure to leave a soft solid which contained 14.8% aziridine corresponding to a purity of 77.5% as N-phenyl-2-aziridinyl ethane sulfonamide, VIII.

Aziridinyl compounds of many different structures are known in the art and it has been observed that the reactivity of the known aziridinyl compounds varies widely. The novel compounds of the present invention exhibit many desirable properties including relatively low vapor pressure. In addition, the compounds are relatively stable thereby enabling purification by conventional procedures such as crystallization to obtain the compounds in good yields. The aziridine compounds of the present invention do not polymerize rapidly on standing in the absence of catalysts. However, they can enter into polymerization reactions with appropriate catalysts, and moreover, are capable of reaction with active hydrogen compounds, particularly active hydrogen containing polymers under suitable reaction conditions. It is to be understood that the term "active hydrogen" as used herein refers to active hydrogen as determined by the well-known Zerewitnoff method.

Among the many uses for the compounds of the present invention are as curing agents for epoxy resins, as components for therapeutic preparations and as comonomers in the preparation of polymeric compositions. In addition, those compounds which have two or more aziridinyl groups in the terminal position, referred to as polyfunctional compounds, are particularly useful as crosslinking agents for polymers containing active hydrogen atoms. Moreover, the polyfunctional aziridines can be utilized for the shrink-proofing of woolen textile materials. To complete the discussions of applications for the novel compounds of the present invention, it is to be noted that observations have indicated suitability as biological alkylating agents such as radio mimetic compounds as well as for the preparation of crosslinked polymers of basic ion exchange properties.

What is claimed is:

1. A sulfonyl-substituted piperazine compound of the structure:

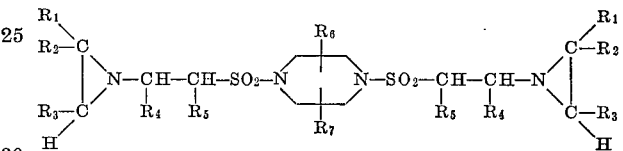

wherein $R_1$, $R_2$, $R_3$, $R_4$, and $R_5$ are hydrogen or alkyl groups from 1 to 4 carbon atoms, and $R_6$ and $R_7$ are hydrogen or methyl.

2.

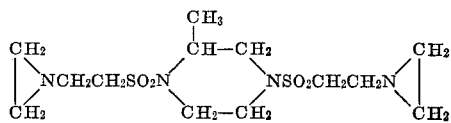

3.

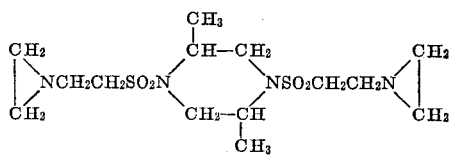

References Cited

UNITED STATES PATENTS

| | | |
|---|---|---|
| 3,196,156 | 7/1965 | Inaba et al. _____ 260—268 |
| 3,235,544 | 2/1966 | Christena et al. _____ 260—239 |

FOREIGN PATENTS 900,137    12/1953    Germany.

OTHER REFERENCES

Houben-Weyl, Methoden der Organischen Chemie, vol. 11 (Stuttgart, 1958), pp. 242–4.

HENRY R. JILES, Primary Examiner

C. M. SHURKO, Assistant Examiner

U.S. Cl. X.R.

26—18.5; 260—30.4, 239, 247.1, 248, 250, 293.4, 830